United States Patent [19]

Melcher

[11] Patent Number: 4,927,699
[45] Date of Patent: May 22, 1990

[54] PROCESS FOR PRODUCING A DECORATIVE FOIL OR SHEET CONTAINING A POLYMER PLASTIC, AND A FOIL OR PLASTIC PRODUCED BY THIS PROCESS

[75] Inventor: Gerhard Melcher, Vienna, Austria

[73] Assignee: Isovolta Osterreichische Isolierstoffwerke Aktiengesellschaft, Wiener Neudrof, Austria

[21] Appl. No.: 141,610
[22] PCT Filed: Apr. 14, 1987
[86] PCT No.: PCT/AT87/00026
§ 371 Date: Dec. 14, 1987
§ 102(e) Date: Dec. 14, 1987
[87] PCT Pub. No.: WO87/06183
PCT Pub. Date: Oct. 22, 1987

[30] Foreign Application Priority Data

Apr. 14, 1986 [AT] Austria ........................... 957/86

[51] Int. Cl.⁵ ............................................. B32B 27/10
[52] U.S. Cl. ................................... 428/203; 156/242; 156/243; 156/246; 428/204; 428/480; 428/483; 428/511; 428/515; 428/516
[58] Field of Search ............... 156/242, 243, 245, 246, 156/307.3, 307.4, 307.7; 428/67, 480, 483, 511, 515, 516, 203, 204

[56] References Cited

U.S. PATENT DOCUMENTS

| | | |
|---|---|---|
| 2,345,013 | 3/1944 | Soday ................... 156/243 |
| 2,769,742 | 11/1956 | Helbiny ................. 156/246 |
| 3,639,202 | 2/1972 | Simon .................. 156/243 |
| 4,543,145 | 9/1985 | Schnell ................. 156/246 |

FOREIGN PATENT DOCUMENTS 1073253 6/1967 United Kingdom ............... 156/246

Primary Examiner—Caleb Weston
Attorney, Agent, or Firm—Bierman and Muserlian

[57] ABSTRACT

During the essentially continuous process for producing a polymer plastic, especially a foil or thin sheet (38) containing polymethyl methacrylate, a highly-viscous polymer plastic is first applied to a flat carrier inside a separating layer, whereby regions of the support surface remain free, in the manner of a surface pattern. Next a low-viscosity polymerizable monomer and/or pre-polymer (30) are cast on to this separating layer in such a way that it forms, over the separating layer, a liquid layer, onto which is applied a flat, thread-like support material (32), which may advantageously have a decorative surface and into which the support material (32) is then embedded or impressed. Next after the possible application of further layers consisting of high and/or low-viscosity plastic, especially inside a second separating layer, the thus produced material coating is transferred to the foil (38) or thin sheet, accompanied by polymerization of the plastics contained therein. In this process, the separating layers prevent the support material from coming close to the surfaces of the sheet (38) to be produced, since the highly-viscous plastic contained in the separating layers does not penetrate the porous support material.

16 Claims, 1 Drawing Sheet

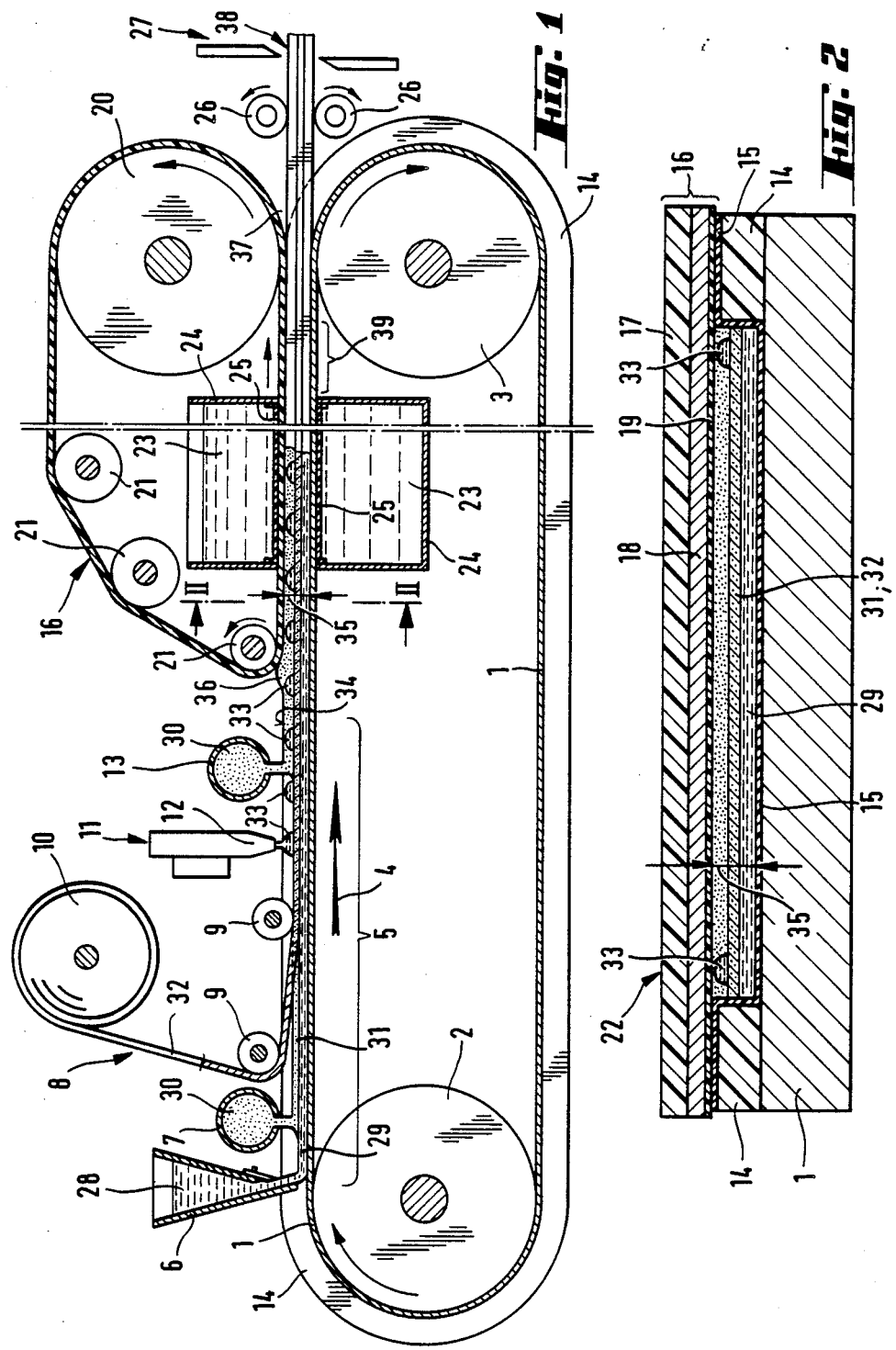

PROCESS FOR PRODUCING A DECORATIVE FOIL OR SHEET CONTAINING A POLYMER PLASTIC, AND A FOIL OR PLASTIC PRODUCED BY THIS PROCESS

TECHNICAL DOMAIN

The invention is concerned with a process for producing a decorative foil or sheet containing a polymer plastic, in which at least one flat, porous and possibly a fibrous carrier is used, and which comprises a transparent protective layer on the decorative surface of the foil of a polymer plastic protecting a decorative layer at least at one of its surfaces. It furthermore concerns a foil or sheet produced by this process.

STATE OF THE ART

A process for producing a foil of this type is known from Austrian Pat. No. 312 472. By this process, a carrier foil is initially produced from a fibrous carrier material impregnated with synthetic resin, and it is then provided at one surface side with a decorative pattern and/or imprint. The carrier foil is then bonded at this decorative surface side with a transparent surface foil which may consist, e.g., also of an acrylate plastic.

Production of such carrier foils is generally effected by impregnating fibrous carrier materials, such as paper, fleece, glass matting and similar, with synthetic resins, such as aminoplastics, phenolic plastics, polyesters, epoxy resins or acrylic resins in the form of solutions or dispersions, and through subsequent drying and/or curing. The impregnating agent must display so low a viscosity that the carrier material is able to absorb the quantity of impregnating agent that will be sufficient to produce a closed foil surface, while already at the beginning of the curing of the thusly impregnated carrier material, usually done in a heated press, the viscosity of the impregnating agent must already be high enough—through precondensation or pre-polymerization—that the impregnating agent cannot flow out or be squeezed out laterally from the carrier material.

For many polymer plastics, such as polymethyl methacrylate or polystyrene, monomers do indeed have a sufficiently low viscosity for impregnating fibrous carrier materials, but at room temperature or at a somewhat higher temperature that is advantageous for impregnating purposes they are so highly volatile that they would evaporate after the carrier material is impregnated, before the pre-polymerization has fully set in.

PRESENTATION OF THE INVENTION

It is the initial object of the invention to make known a process for producing a polymer plastic containing foil or sheet of the type known from Austrian Pat. No. 312 472, in which the polymerizable plastic to be contained in the pores of the flat carrier material may also be one on a monomer basis that at room temperature or at a slightly increased temperature is highly volatile and/or with regard to which air oxygen has a disturbing effect on the polymerization.

This problem is solved according to a first variant of the invention by a process which is characterized by that a polymer plastic in solid or highly viscous form with a viscosity higher than 10,000 mPa.s is applied to an appropriately flat support inside a separating layer, whereby eventually, regions of the support surface arranged in the manner of a surface pattern remain free of plastic, by that to this layer of solid or highly viscous plastic a low-viscosity polymerizable monomer and/or pre-polymer with a viscosity of less than 100 mPa.s is applied, which will fill any still free regions in the separating layer and form over it a liquid layer, by that the porous carrier material is then applied onto this liquid layer, which sinks or is pressed into the liquid layer, by that eventually, thereupon a highly-viscous plastic with a viscosity of higher than 10,000 mPa.s is applied to form a second separating layer, and by that the thusly produced compound material is transferred to the foil or thin sheet under polymerization of the plastics contained in it. Advantageously, regions of highly-viscous plastic arranged in the manner of a surface pattern in the second separating layer can remain free.

According to a second variant of the invention, the problem set to the invention is solved in a process, characterized by that on an eventually, flat support there is applied a liquid layer of a low-viscosity polymerizable monomer and/or pre-polymer with a viscosity of less than 100 mPa.s, by that onto this liquid layer the porous carrier material is applied, which sinks or is pressed into the liquid layer, by that then a highly viscous plastic with a viscosity of higher than 10,000 mPa.s is applied to form a separating layer, whereby eventually, regions of plastic arranged in the manner of a surface pattern in this separating layer will remain free, and by that the thusly produced compound material is transferred to the foil or thin sheet under polymerization of the plastics contained in it.

In an advantageous embodiment of the invention, the process according to the invention is characterized by that prior to the polymerization, a low-viscosity polymerizable monomer and/or pre-polymer with a viscosity of less than 100 mPa.s is applied on to the compound material, forming a free liquid level.

According to a further advantageous embodiment of the process according to the invention, the plastic used in solid or highly-viscous form is of the same type as the monomer and/or pre-polymer used in a low-viscosity form.

According to other advantageous embodiments of the process according to the invention, at least one of the separating layers serving as protective layer is produced of a transparent plastic and/or the carrier material used is of uniform color or decoratively imprinted and/or coated on at least one side.

In a further advantageous embodiment of the invention, the process of the invention is characterized by that the compound material is kept at preset temperatures during polymerization. The compound material can then be advantageously kept at these preset temperatures by a liquid bath or by a water bath.

According to still other embodiments of the process according to the invention, the highly viscous polymerizable plastic is applied, at least within one separating layer, in regions that are isolated from each other and possibly punctiform, or in strip-shaped regions and possibly meandering in shape.

In a further embodiment of the process according to the invention, the support, on to which the respective separating layer is to be applied, is moved relative to a coating station for this plastic, for the purpose of applying the highly viscous polymer plastic in at least one of the separating layers. In this instance, a casting head may advantageously serve as the coating station, or, for applying the highly-viscous polymerizable plastic in the form of a meandering strip, the coating station used may advantageously have a coating nozzle which performs an oscillating motion transversely to the moving direction of the support.

According to further advantageous embodiments of the invention, the process according to the invention is characterized by that during at least part of the polymerization process, the compound material is held between two boundary bodies until its solidification and/or that the polymerization of the plastic in the material coating takes place inside a separating envelope adjacent to it, which seals off the compound material against influences acting from outside, such as humidity and/or water. For the continuous production of the foil or sheet in web-form, the boundary bodies can advantageously be formed by two conveyor belts, and/or the separating envelope can advantageously be formed by two sections of the conveyor belts running parallel to each other, which are connected to each other at the edges or are enclosing there only a small gap between them, whereat—in the case where a liquid bath is employed—the compound material applied between the two conveyor belts is advantageously drawn through a flat hose which adjoins the two conveyor belts and separates them from the heat transfer medium of the liquid bath.

According to a last advantageous embodiment of the invention, the low-viscosity polymerizable monomer and/or pre-polymer employed and possibly the plastic inserted in solid or highly viscous form into the separating layers is one of a monomethyl methacrylate or one on the basis of the latter.

The invention is furthermore concerned with the foil or sheet produced according to the invention process, which is characterized by that in the finished foil the separating layers consisting of a plastic on the basis of monomethyl methacrylate and serving as protective layers have at least at one side a thickness of more than 50 μm, but preferably more than 100 μm.

BRIEF DESCRIPTION OF THE DRAWINGS

FIG. 1 shows, in a schematic presentation, a device for the continuous production of a plastic foil of polymethyl methacrylate, in which a flat, fibrous carrier material, particularly a decoratively imprinted and/or dyed paper, is embedded in such a manner than between the carrier material and the two foil surfaces a separating layer consisting of polymethyl methacrylate of constant thickness is formed. The individual layers serving to structure the foil to be produced are shown in exagerated thickness to provide a better view.

This device has a continuous lower conveyor belt 1 made of steel, which is movable by way of two rollers 2 and 3 in the conveying direction 4. Above this conveyor belt 1, in a first region 5 there are arranged—in the following sequence, one after the other—a casting flow head 6, a first coating device 7, a feeder station 8 for the flat carrier material with two feeder rolls 9 and a supply roll 10, a coating station 11 with a coating nozzle 12 oscillating in a direction perpendicular to the plane of the drawing, as well as a second coating device 13. As can be seen from FIG. 2, which shows a section along line II—II in FIG. 1, the lower conveyor belt 1 has at both its edges strip-shaped supports 14 and at its upper side it is coated with a foil 15 of polytetrafluoroethylene. In the conveying direction 4 connecting to region 5, above the lower conveyor belt 1, a continuous upper conveyor belt 16 is provided, which consists of a plastic belt 17 which at its lower side is laminated to an aluminum foil 18 that in turn has a coating of a polytetrafluoroethylene film 19 on the bottom side of the conveyor belt. This conveyor belt 16, which runs over a cylinder and rollers 20 and 21, respectively, and which with its active flat area rests on the lateral supports 14 of the lower conveyor belt 1 (see FIG. 2), in such a manner that together with the lower conveyor belt 1 it thereby forms a separating envelope 22 which is movable in the conveying direction 4 and is again ripped apart at the end of the two conveyor belts 1 and 16, respectively. This separating envelope 22 thereby passes through a curing device, consisting essentially of a container 24 filled with a liquid heat transfer medium 23, e.g., water, whereby the envelope 22 slides in a flat hose 25 of thin plastic film tightly adjoining the envelope and connected to the container 24, which hose prevents a direct contact of the heat transfer medium 23 with the envelope 22. Finally, at the end of the two conveyor belts 1 and 16, there follow, in the conveying direction, a pair of conveying rollers 26 and a cutting device 27.

SEVERAL ADVANTAGEOUS WAYS TO CARRY THROUGH THE INVENTION

A process to produce a 0.51 mm thick foil of polymethyl methacrylate in which is embedded a 0.11 mm thick paper that is provided with a decorative imprint on one surface, carried through with the aid of the device according to FIGS. 1 and 2, is described below.

As starting materials for the production of these foils serve:

A highly viscous pre-polymerizate of monomethyl methacrylate (MMA) with a viscosity at room temperature of 40,000 mPa.s. To produce this pre-polymerizate, 0.015% azoisobutyronitrile ("Porofor N" made by Bayer) as a radial forming cross-linking agent and 0.18% mercaptoacetic acid are added and the pre-polymerization is carried through for approx. 100 min. at 88° C., whereupon polymerization is stopped through cooling and adding of a small quantity, e.g., 0.0038%, of a radial stopper. To the thusly obtained pre-polymerizate, which is stable and can be stored for a longer period of time, additional 4% azoisobutyronitrile are then added immediately prior to use.

A low viscosity mixture of MMA and the above described storageable pre-polymerizate with a viscosity of 75 mPa.s at room temperature, whereat this viscosity value is adjusted by the added quantity of the pre-polymerizate. 4% azoisobutyronitrile are added immediately prior to use.

A 0.11 mm thick imprinted decorative paper strip with a weight of 80 g/m$^2$ and air permeability of 20 s according to Gurley.

To carry through the process, there is first poured with the aid of the casting head 6 onto the conveyor belt 1, which moves in the conveying direction at a speed of 0.5 m/min, a highly viscous MMA-pre-polymerizate 28 in a layer 29 serving as the first separating layer with a thickness of 0.2 mm, onto which there is then applied by means of coating device 7, the coating heat of which essentially consists of a tube with coating orifices distributed along the length of the tube, the low-viscosity mixture 30 of MMA and MMA-pre-polymerizate in the form of an additional, 0.11 mm thick layer 31. The two superimposed layers 29 and 31 then pass the supply station 8, where the decorative paper strip 32 is pulled off from the supply roll 10 by way of coating roller 9 in the conveying direction 4 and is thereby initially pressed lightly into the surface of the low-viscosity layer 31, whereupon the paper strip 32 is quickly saturated by the low-viscosity mixture 30 of layer 31 and sinks down on the upper side of layer 29. The highly viscous material of layer 29 cannot penetrate into the pores of the paper, so that the paper strip 32 is kept at a constant distance from conveyor belt 1.

In coating station 11 a meandering strip-shaped coating 33 of the highly viscous pre-polymerizate is applied in a thickness of 0.2 mm to the decorative paper strip 32 saturated with the low-viscosity mixture, in order to serve as a second separating layer; this application is effected by means of the coating nozzle 12 which executes an oscillating motion perpendicular to the conveying direction 4 over nearly the entire width of the decorative paper strip 28. Lastly, with the aid of the second coating device 13 which is similar to the first coating device 7, the free space between the meandering strip of coating 33 is then filled with the low-viscosity mixture 30, and above the coating 33, a very thin mixture-layer is formed with a free liquid level 34.

The compound material 35 applied in this manner to lower conveyor belt 1 between the two coatings 14 is then covered by the arriving upper conveyor belt 16, in such a manner that the compound material 36 is tightly enclosed by the separating envelope 22 formed by the two conveyor belts 1 and 16 and the strip-shaped supports 14. Upon arrival of the upper conveyor belt 16 on the surface of the cast low-viscosity mixture 30, a hump 36 is created that prevents the entry of air bubbles under the upper conveyor belt 16. This compound material 35 together with the envelope 22 is then passed through the approximately 20 m long curing device, in which water is kept as heat transfer medium 23 at a temperature of 75° C., so that the compound material 35 will pass through the curing device in about 40 minutes. The compound material 35 is initially brought quickly to the temperature of the heat transfer medium, at which the polymerization respectively curing of the compound material starts. The heat that is developed by the exothermal polymerization respectively cross linking reaction soon causes the temperature in the curing compound material 35 to rise above that of the heat transfer medium 23, whereupon heat is transferred from the compound material 35 to the heat transfer medium 23. Due to the high specific heat of the heat transfer medium it is achieved that the temperature rise in the curing material is not too great. In the present example, the temperature of the curing material must not exceed 100° C., as troubling gas bubbles would otherwise form in it.

The envelope 22 which rips apart at 37 now releases the cured foil 38 which is pulled off in the conveying direction by the pair of transport rollers 26 and is then cut into single pieces with the aid of cutting device 27 and is subsequently stacked. The foil described above has two separating layers, between which the decorative paper is centered. By virtue of its symmetrical structure, the foil has no tendency to roll or assume a dish-like shape, and can be employed or processed in variegated ways. An important use is a decorative surface foil in the production of synthetic resin laminated sheets intended for exterior applications. To produce such laminated sheets, a stack is formed, e.g., by several soda kraft papers impregnated with a phenol formaldehyde resin and two such decorative foils on the basis of polymethyl methacrylate as surface layers, which stack is then pressed—as usual—in a heated press at a mold pressure of about 700 N/cm$^2$ and at a temperature of 140° C. The polymethyl methacrylate softens and combines with the curing soda kraft papers impregnated with artificial resin to form the finished laminated sheet. In addition, at this molding temperature of 140° C., an after-cure of the acrylate plastic begins, whereby—because of the very small monomer portion in the foil material also at the beginning of the after-cure period—the molding temperature of 140° C. can no longer result in the formation of bubbles.

Another advantageous application of the foils produced according to the process of the invention is their use as decorative coating material for carrier sheets, such as particle boards. In this case, the coating is effected either by gluing on of the foil or by the so-called direct coating, in which the foil is hot molded with the carrier sheet directly or together with an intermediate layer of a soda kraft paper impregnated with a phenolic resin.

An after-cure of the foil produced by the process of the invention can be effected advantageously also in the course of the continuous foil production process. To this end, e.g., in the device described with the aid of FIG. 1, the region 39 situated between the container 24 and the rollers 3 and 20 can be appropriately lengthened and a hot air heating device can be arranged in it. Upon passing through this heating device, the two conveyor belts 1 and 16, as well as the foil 38 enclosed by them are heated to a temperature of 140° C. and the foil is thereby after-cured. The after-cure of the foil produced by the process of the invention can be effected advantageously also by exposure to electron-beams in place of by hot-air heating.

According to a simplified variant of the process of the invention, a foil can also be produced, which has a separating layer only on one side, between the decorative paper and the foil surface. In this variant, the layers 29 and 31 as well as the decorative paper strip 32 are applied first, as described pursuant to FIG. 1, whereupon the decorative paper strip impregnated with a low-viscosity mixture is coated with the aid of the coating device 13 with a thin layer of the same. The low-viscosity mixture. Thus, the meandering coating 33 serving as a second separating layer is eliminated in this variant. The application as a decorative surface foil of a foil produced in this manner is then mostly such that it is joined to a carrier material at its side away from the separating layer. Such foils are advantageously used when their tendency to roll caused by the foil asymmetry does not disturb the further processing.

However, according to another process variant for producing a foil with a separating layer on only one side by means of the process described with the aid of FIGS. 1 and 2, it is possible to dispense with the coating with the highly viscous MMA pre-polymerizate 28, i.e., the low-viscosity mixture 30 is poured on in the form of a liquid layer 31 directly onto the lower conveyor belt 1.

In all the process variants described above, it is important that in the compound material a low-viscosity monomer and/or pre-polymer be applied as the last layer, forming initially a free liquid level 34 upon which the upper conveyor belt 16 will then ascend forming a hump 36 whereby the drawing in of air bubbles is prevented. In process variants, in which the compound material is not held inside two boundary bodies, namely when the upper side of the compound material forms a free surface in the course of the polymerization process, e.g., in a dry nitrogen atmosphere, then it is possible to dispense with such an uppermost layer of a low-viscosity monomer and/or pre-polymer.

COMMERCIAL SUITABILITY

The decorative foils produced according to the process of the invention can be used, by virtue of their weathering resistance, particularly as surface foils in the production of synthetic resin laminated sheets intended for outdoor use.

I claim:

1. Process for the continuous production of a decorative foil (38) containing a polymer plastic, in which at least one flat, porous and fibrous carrier is used, and which comprises a transparent protective layer of a polymer plastic on a decorative surface of the foil protecting a decorative layer at least at one of its surfaces, characterized by that a highly viscous polymer plastic on the basis of prepolymerizate of monomethyl methacrylate with a viscosity higher than 10,000 mPa.s is applied to a flat moving support to form a first separating layer, by that to this layer of highly viscous polymer plastic a low-viscosity liquid (30) consisting of at least one of the members of the group consisting of polymerizable monomer and pre-polymer each on the basis of monomethyl methacrylate with a viscosity of less than 100 mPa.s is applied, which will fill any still free regions in said first separating layer and form over it a liquid layer (31), by the porous carrier material (32) which has a decorative surface is then applied onto this liquid layer (31), whereby it is dipped into said liquid layer, by that eventually thereupon a highly-viscous plastic on the basis of prepolymerizate of monomethyl methacrylate with a viscosity higher than 10,000 mPa.s is applied to form a second separating layer, and by that the thusly produced compound material (35) is transformed into the decorative foil under polymerization of the plastics contained in the said compound material, wherein one of the separating layers forms the transparent protective layer.

2. Process for the continuous production of a decorative foil (38) containing a polymer plastic, in which at least one flat, porous and fibrous carrier is used, and which comprises a transparent layer on a decorative surface of the foil protecting a decorative layer of a polymer plastic at least at one of its surfaces, characterized in that a foil of polymer plastic on the basis of polymerizate of monomethyl methacrylate is applied to a flat moving support to form a a first separating layer, that onto this foil a liquid layer of a polymer plastic (30) of a low-viscosity consisting of at least one of the members of the group being formed of polymerizable monomer and pre-polymer each on the basis of monomethyl methacrylate with a viscosity of less than 100 mPa.s is applied, by that the porous carrier material (32) which has a decorative surface is then applied onto this liquid layer (31), whereby it is dipped into said liquid layers, by that eventually thereupon a highly-viscous plastic on the basis of pre-polymerizate of monomethyl methacrylate with a viscosity of higher than 10,000 mPa.s is applied to form a second separating layer, and by that the thusly produced compound material (35) is transformed into the decorative foil under polymerization of the plastic contained in said compound material wherein one of the separating layers forms the transparent protective layer.

3. Process according to one of the claims 1 or 2 characterized by that as an additional last step prior to the polymerization, a low-viscosity liquid mixture (30) consisting at least of one of the members of the group consisting of polymerizable monomer and pre-polymer each on the basis of monomethyl methacrylate with a viscosity of less than 100 mPa.s is applied onto the compound material, forming a free liquid level (34).

4. Process according to one of claims 1 or 2 characterized by that the compound material is kept at preset temperatures by a liquid bath.

5. Process according to one of the claims 1 or 2, characterized by that at least within one separating layer, the highly viscous polymerizable plastic is applied in regions that are isolated from each other.

6. Process according to one of claims 1 or 2, characterized in that the polymerization of the plastic in the compound material (35) takes place inside a separating envelope adjacent to it, which seals off the compound material (35) against influences acting from outside.

7. Foil produced according to a process according to one of claims 1 or 2 which is characterized in that in the finished foil (38) the separating layers consisting of a plastic on the basis of monomethyl methacrylate and serving as protective layers have at least at one side a thickness of more than 50 μm.

8. Process according to claim 1 or 2, characterized in that in at least one separating layer regions arranged in the form of a surface pattern remain free of the highly viscous plastic.

9. Process according to one of the claims 1 or 2, characterized by that at least within one separating layer, the highly viscous polymerizable plastic is applied in strip-shaped regions that are meandering in shape.

10. Process according to claim 9, characterized in that for applying the highly-viscous polymerizable plastic in strip-shaped regions, a coating station (11) is used having a coating nozzle (12) which performs an oscillating motion transverse to the moving direction (4) of the support, to form the strip-shaped regions in a meandering shape.

11. Process according to one of the claims 1 or 2, characterized by that—for the purpose of applying the highly viscous polymer plastic in at least one of the separating layers—the support, onto which the respective separating layer is to be applied, is moved relative to a coating station for this plastic.

12. Process according to claim 11, characterized in that a casting head (6) is used at the coating station.

13. Process according to one of claims 1 or 2, characterized in that during at least part of the polymerization process, the compound material (35) is held between two boundary bodies until its solidification.

14. Process according to claim 13 characterized in that for the continuous production of the foil, the boundary bodies are formed by two conveyor belts (1,16).

15. Process according to claim 14, characterized in that a separating envelope is formed by two sections of the conveyor belts (1,16) running parallel to each other, which are connected to each other at the edges or are enclosing there only small gaps between them.

16. Process according to claim 14, characterized in that the compound material (35) applied between the two conveyor belts (1,16) is advantageously drawn through a flat hose which adjoins the two conveyor belts and separates them from a heat transfer medium of a liquid bath.

* * * * *